United States Patent [19]

Goossens

[11] Patent Number: 5,508,608
[45] Date of Patent: Apr. 16, 1996

[54] MAGNETIC FLUX DEVICE FOR MEASURING ROTARY MOTIONS AND FOR GENERATING AN ELECTRIC ALTERNATING SIGNAL REPRESENTATIVE OF THE ROTARY MOTIONS

[75] Inventor: André F. L. Goossens, Rumst, Belgium

[73] Assignee: ITT Automotive Europe GmbH, Frankfurt am Main, Germany

[21] Appl. No.: 325,458

[22] PCT Filed: Jan. 14, 1993

[86] PCT No.: PCT/EP93/00072

§ 371 Date: Oct. 28, 1994

§ 102(e) Date: Oct. 28, 1994

[87] PCT Pub. No.: WO93/22688

PCT Pub. Date: Nov. 11, 1993

[30] Foreign Application Priority Data

Apr. 29, 1992 [DE] Germany ........................ 42 13 977.5

[51] Int. Cl.⁶ ............................. G01P 3/488; G01P 3/44; G01D 5/20; H02K 21/26
[52] U.S. Cl. .................... 324/174; 324/207.25; 310/155; 310/168
[58] Field of Search ...................... 324/163, 166, 324/173, 174, 207.15, 207.25; 310/155, 168; 384/448

[56] References Cited

U.S. PATENT DOCUMENTS 4,721,864  1/1988  Goosens ........................ 324/174 X

FOREIGN PATENT DOCUMENTS

| 0355502 | 2/1990 | European Pat. Off. . |
| 2112298 | 6/1972 | France . |
| 1204706 | 11/1965 | Germany . |
| 2019801 | 11/1971 | Germany . |
| 2144162 | 3/1973 | Germany . |
| 3542962 | 6/1987 | Germany . |
| 3630062 | 3/1988 | Germany . |
| 3927007 | 2/1991 | Germany . |
| 712760 | 1/1980 | U.S.S.R. ................ 324/174 |
| 1082339 | 3/1984 | U.S.S.R. . |
| 1595680 | 8/1981 | United Kingdom ........ 324/174 |

*Primary Examiner*—Gerard R. Strecker
*Attorney, Agent, or Firm*—Ratner & Prestia

[57] ABSTRACT

A device for measuring rotary motions having a signal generator ring which rotates with the rotating part and of a double-sided measuring coil. Within the core of the measuring coil there are a permanent magnet, which is magnetized perpendicularly to the coil axis, and two elongated pole shoes which are arranged on the pole surfaces of the permanent magnet and whose end pieces protrude from both sides of the coil and reach almost as far as the signal generator ring. The signal generator ring and the pole shoes are designed, arranged and attuned in respect of one another so that, during the rotary motion, the magnetic flux alternately passes via the end piece of one pole shoe to the end piece of the pole shoe arranged on the second pole surface, which end piece protrudes from the other side of the coil, and thereupon passes via the two other end pieces of the pole shoes. Provided as signal generator ring is a toothed wheel with inwardly directed teeth or several toothed wheels firmly coupled with one another.

14 Claims, 4 Drawing Sheets

MAGNETIC FLUX DEVICE FOR MEASURING ROTARY MOTIONS AND FOR GENERATING AN ELECTRIC ALTERNATING SIGNAL REPRESENTATIVE OF THE ROTARY MOTIONS

This application is the U.S. national-phase application of PCT International Application No. PCT/EP93/00072.

BACKGROUND OF THE INVENTION

This invention relates to the measurement of rotary motion and, more particularly, to a device for generating an electric alternating signal representative of rotary motion. This device includes a signal generator ring which rotates with the part undergoing the rotary motion and a stationary inductive transducer which is arranged within the surface defined by the signal generator ring and which has a double-sided measuring system with a measuring coil, a coil core and pole shoes.

One device used to measure rotary motion is described in German Published Patent Application (Offenlegungsschrift DE) No. 39 27 007A1.

In that reference, a toothed disk with inwardly directed teeth serves as the signal generator ring. Inside the disk, there is a diametrically aligned measuring coil. The coil encloses a magnetic flux guide piece the length of which approximately corresponds to the inside diameter of the disk, reduced by the necessary distance to allow an air gap between the ends of the magnetic flux guide piece and the inwardly directed teeth of the signal generator ring. The magnetic flux guide piece protrudes from both sides of the coil. Permanent magnets, oriented such that they are magnetized perpendicularly to the axis of the magnetic flux guide piece, are placed on both sides of this magnetic flux guide piece at the very ends thereof. The magnets are thus also disposed close to the inwardly directed teeth. If there are two permanent magnets at a time on the sides of the ends of the magnetic flux guide piece, these magnets are arranged so that both of them have the same pole on the opposite sides of the magnetic flux guide piece and, consequently, point outwards with the same pole. As the indicator ring rotates, when both magnets of one coil side are simultaneously directly opposite teeth extending inwardly from the ring, a magnetic flux forms from the outside of the magnets through the toothed disk to the magnetic flux guide piece, and then to the inside of the magnets. When the tooth gaps are opposite the magnets, the main flux passes from the outside of the magnets through the air in the space created by the tooth gap to the magnetic flux guide piece and to the insides of the magnets. In other words, the magnetic flux passes to the magnetic flux guide piece and to the magnet pole seated on the guide piece either via a tooth if it is a tooth that is opposite the individual magnet, or via air if it is a tooth gap that is opposite the magnet. Thus, on the two coil sides the magnetic flux is alternating through the magnetic flux guide piece in dependence on whether tooth gaps or teeth are opposite the magnets. Thus, the changes in the magnetic flux that are caused by the individual permanent magnets in cooperation with the individual teeth are, in a sense, superimposed upon one another. The achievable value of the measuring signal depends on the number of the permanent magnets used.

Another device used to measure rotary motion is described in German Published Patent Application (Offenlegungsschrift DE) No. DE 35 42 962 A1. This reference describes a magnet core inserted into the measuring coil of an inductive transducer. The magnet core is magnetized perpendicularly to the coil axis and has on its pole surfaces, parallel to the axis of the measuring coil, plate-shaped pole shoes. The pole shoes protrude from the side of the coil facing the outwardly directed teeth of a signal generator ring. The measuring signal in such a measuring arrangement, where the motion to be measured is only on one side of the measuring coil, essentially depends on the air gap between the pole shoes and the teeth and, thus, on assembly tolerances.

SUMMARY OF THE INVENTION

It is an object of the present invention to provide a measuring device which, as compared with known devices, produces a higher useful signal and is less sensitive to air gap tolerances. Also of special interest is the suitability of small-diameter signal generator rings so as to favor assembly in a wheel bearing.

It has been found that this object can be achieved by means of a device of the type referred to above which has a coil core with a permanent magnet, which is magnetized perpendicularly to the coil axis, and elongated pole shoes which are provided on the pole surfaces of the magnet and arranged parallel to the coil axis and whose end pieces protrude from both sides of the coil and extend as far as the signal generator ring. The signal generator ring and the pole shoes are arranged with respect to one another so that, during the rotary motion, the magnetic flux alternately passes via the end piece of one pole shoe to the diametrically opposite end piece of the pole shoe arranged on the other pole surface. As the ring rotates, the flux then passes via the two other end pieces of the pole shoes and alternates back and forth between the two directions.

In accordance with an advantageous embodiment of the present invention, the signal generator ring has the design of a toothed wheel with inwardly directed teeth, with the toothed wheel and the pole shoes being designed and arranged so that, any time the end piece of one pole shoe is opposite a tooth, the diametrically opposite end piece of the other pole shoe is likewise opposite a tooth, the two other end pieces of the pole shoes being opposite tooth gaps.

By designing the measuring coil and arranging the pole shoes in the core of the measuring coil relative to the magnetic segments or teeth of the signal generator ring, there is achieved a particularly high change of the magnetic flux through the coil via the air gaps on both sides and via the signal generator ring. The magnetic flux passing via an end piece of one pole shoe of the double-sided measuring coil, via the magnet core to the diametrically opposite end piece of the second pole shoe, via the air gaps between the end pieces of the pole shoes and the signal generator ring, repeatedly changes its direction of flow during the relative rotary motion, which will bring about the desired increase in the induced useful signal. A further advantage of the present invention is that tolerance-implied eccentricity of the rotating measuring coil will have a relatively small effect in the signal generator ring since the air gaps on the opposite sides are more or less arranged in series, thus an increase in the air gap on one side being largely compensated by a reduction in the air gap on the opposite side. A minimum useful signal will be ensured even in case of a deviation from the mid-position.

An alternative embodiment of the invention has two toothed wheels coupled with each other as the signal generator, with the transducer being arranged between them and with the coil core again consisting of a permanent magnet magnetized perpendicularly to the coil axis with two elongated pole shoes provided on the pole surfaces of the magnets and arranged parallel to the coil axis and whose end pieces protrude from both sides of the coil and extend as far as the teeth. The toothed wheels and the pole shoes are designed and arranged so that, any time the end piece of one pole shoe is opposite a tooth, the end piece of the second pole shoe protruding from the second coil side is likewise opposite a tooth, the two other end pieces of the pole shoes being opposite tooth gaps. The two toothed wheels of the signal generator can be arranged coaxially, with the outside toothed wheel being provided with inwardly directed teeth and the inside toothed wheel being provided with outwardly directed teeth.

It is also possible to arrange the two toothed wheels parallel to each other and to gear them on the confronting front faces. In this case, the double-sided measuring coil is arranged stationarily between the toothed wheels and parallel to the axis around which the two toothed wheels are revolving.

Instead of the toothed wheels, it is possible to use signal generator rings with clearances or rings composed of magnetic and non-magnetic segments, with the clearances or the non-magnetic segments corresponding to the tooth gaps.

Further characteristics, advantages and applications of this invention will become evident from the following description of embodiments, reference being made to the accompanying drawings.

DETAILED DESCRIPTION OF THE INVENTION

Figure 1:
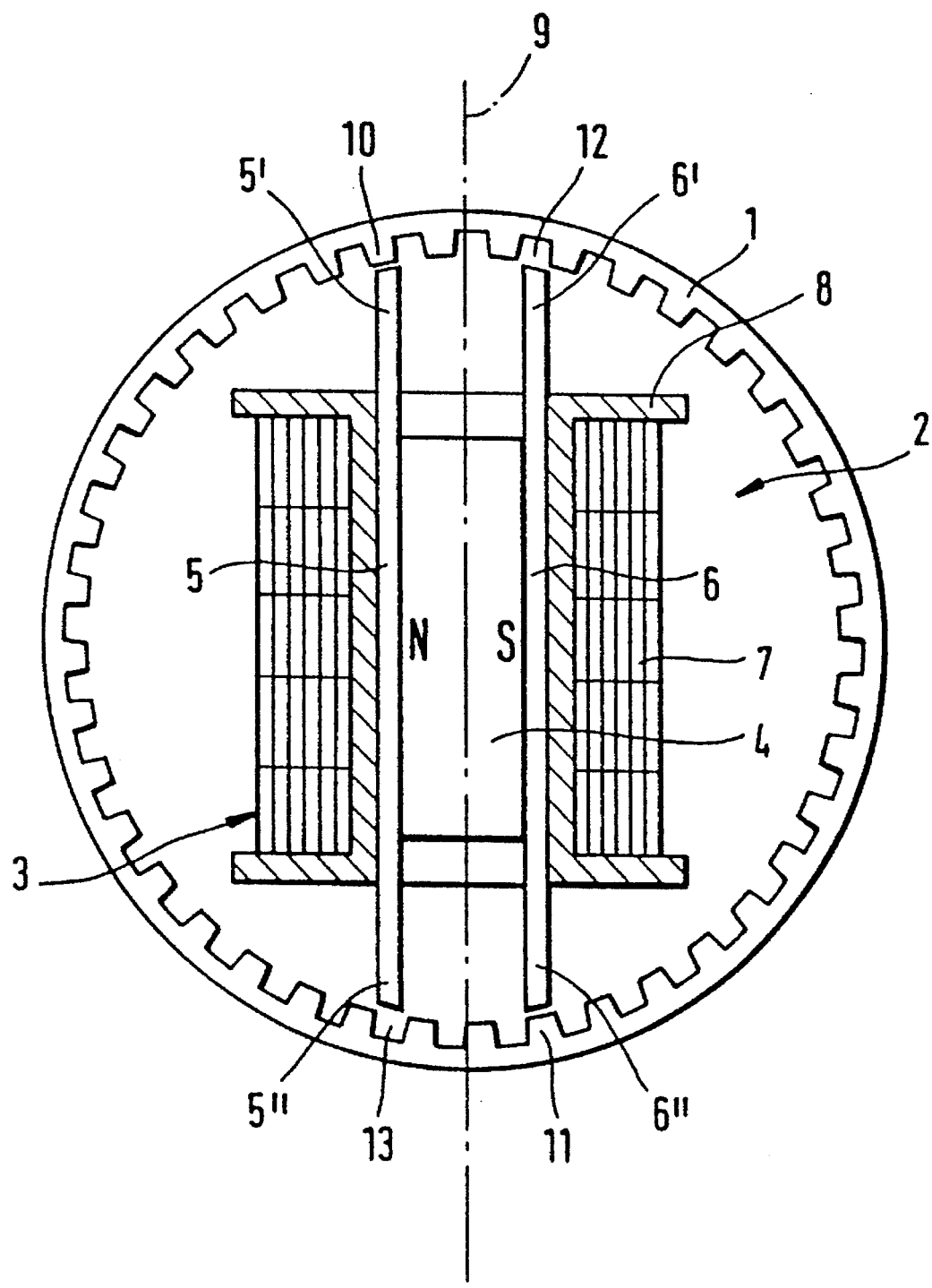
FIG. 1 is a schematic representation of a measuring device constructed in accordance with the present invention, where a measuring coil is arranged inside a signal generator ring having inwardly directed teeth.

FIG. 1 illustrates the basic design and mode of operation of a measuring device constructed in accordance with the present invention. Essentially, the measuring device consists of a signal generator ring 1 and a stationary transducer 2. Often, the transducer is also referred to as a "sensor". This transducer has the design of a double-sided measuring system composed of a measuring coil 3, a permanent magnet 4 and two pole shoes 5, 6. One winding 7 on a coil form 8 or several such windings 7 serve as measuring coil 3. The permanent magnet core is magnetized perpendicularly to the coil axis 9 indicated by a dash-dotted line. The pole shoes 5, 6 are in the form of elongated plate-shaped solids, each disposed on a pole surface N, S of the magnet 4 so that they protrude from both axial ends of the coil 3 in a direction parallel to coil axis 9 and extend as far as the signal generator ring 1, with a small, precisely defined air gap existing on both ends of the measuring coil between the ends, or rather front faces, of the pole shoes and the signal ring 1 that rotates around the measuring coil.

A toothed wheel with inwardly directed teeth serves as signal generator ring 1 in the embodiment depicted in FIG. 1. The magnetic field generated by the permanent magnet 4 produces a magnetic flux through the pole shoes, the air in the gaps on both ends of the double-sided measuring system, and the signal generator ring. Because the magnetic flux changes depending on the air gap between the pole shoes 5, 6 or rather the relative position of the pole shoe front sides with respect to the teeth (or magnetic poles), and the signal generator disk 1, a signal voltage is induced in a known manner in the measuring coil 3, and the value and/or frequency of this voltage can be evaluated to determine the speed of the signal generator disk.

In the measuring device of the present invention, the pole shoes 5, 6 and the teeth of the signal generator ring 1 are disposed relative to one another such that when the end piece 5' of a pole shoe 5 is directly opposite a tooth 10 of the signal generator ring 1, the corresponding opposite end 6" of the pole shoe 6 on the second pole surface of the permanent magnet 4 will also be directly opposite a tooth 11.

At this time, when end pieces 5', 6" of the pole shoes 5 and 6, respectively, confront teeth 10, 11 of the signal generator ring 1, the two other end pieces 6', 5" of the pole shoes 6, 5 will be opposite tooth gaps 12, 13. At such a time, the main magnetic flux passes through the teeth 10, 11 of the signal generator ring 1, across the narrow air gaps between these teeth and the end pieces 5', 6" of the pole shoes 5 and 6, through the permanent magnet 4 and through the signal generator ring 1. As signal generator ring 1 rotates, the end pieces 5', 6" arrive at a position opposite tooth gaps, and the two end pieces 6', 5" of the pole shoes 6, 5 now are opposite teeth. The magnetic flux through the pole shoes 5, 6 will thereby change its direction. A signal voltage will be induced in the measuring coil 3 which is composed of two constituents—the magnetic flux reduction because of the transition from the teeth to the tooth gaps by ends 5' and 6"; and the magnetic flux increase in the opposite direction because of the transition from the tooth gaps to the teeth by ends 6' and 5".

Instead of a signal generator ring with inwardly directed teeth, it is also possible to use a ring comprising, for example, magnetic and non-magnetic segments or clearances, with the non-magnetic segments or the clearances corresponding to the tooth gaps.

In the embodiment of the present invention illustrated in FIG. 1, the stationary transducer, namely the measuring coil 3, is disposed in the area defined by the signal generator ring and on an inside diameter of the signal generator ring. The two pole shoes 5, 6 are disposed on parallels to this inside diameter.

Figure 2:
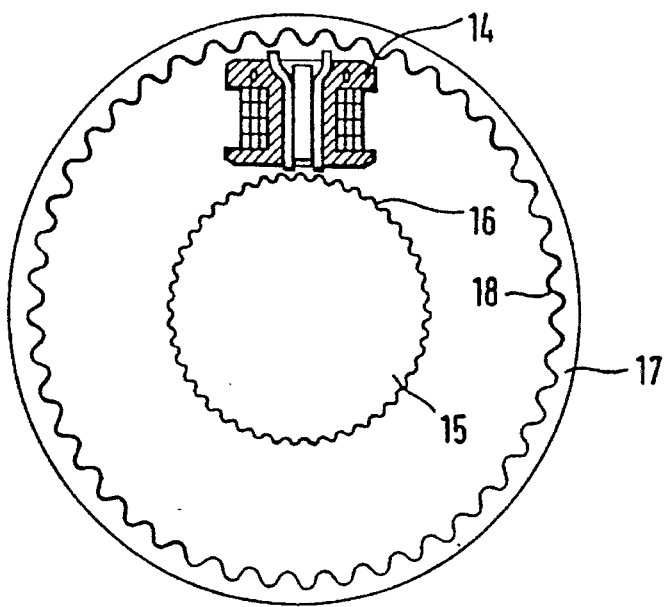
FIG. 2 is a schematic representation of an alternative embodiment of this invention where two coaxially arranged toothed wheels are used as a signal generator ring, the double-sided measuring coil being arranged between these toothed wheels.

In this embodiment, a change in the magnetic flux is brought about on both axial ends of the double-sided measuring coil 3 by means of the teeth and tooth gaps as a consequence of the rotary motion to be measured. This induces a voltage in the coil 3, the amplitude and frequency of which represent the rotary motion. It is also possible, however, as illustrated in FIG. 2, to arrange a double-sided measuring coil 14 between two different toothed wheels that are coupled with each other. A corresponding design and arrangement of the pole shoes, in particular of the ends of the pole shoes, in relation to the teeth and tooth gaps as was described with reference to FIG. 1, in this case also brings about a change in direction of the magnetic flux. Thus, a relatively high useful signal composed of two constituents is generated.

In FIG. 2, the measuring coil 14 is placed between an inside signal generator ring 15, namely a toothed wheel with outwardly directed teeth 16, and an outside ring 17 having inwardly directed teeth 18 in a manner similar to that of the signal generator ring 1 of FIG. 1. The embodiment of FIG. 2 is applicable, for example, when space is not available inside a rotating shaft for mounting the measuring coil.

Figure 3:
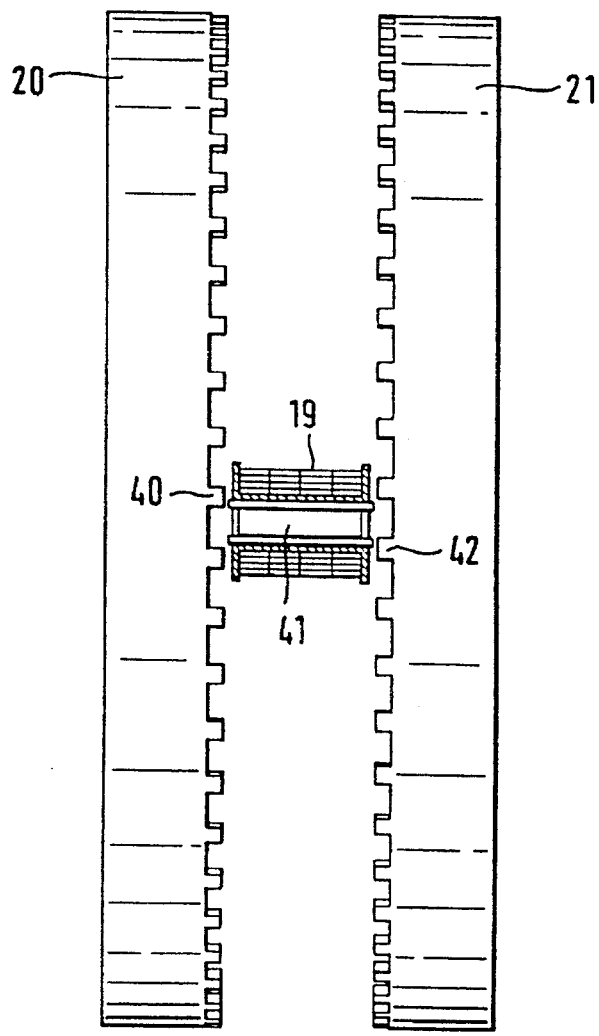
FIG. 3 is a schematic representation of another embodiment of the present invention where the signal generator ring consists of two parallel toothed wheels coupled with each other.

In FIG. 3, an embodiment of the present invention is represented where a double-sided measuring system, or rather a double-sided measuring coil 19, is arranged parallel to an axle whose rotary motion is to be measured. In this case, the signal generator rings 20, 21 are disposed on two parallel disks in the form of spur gears with the same pitch. The two signal generator rings or tooth wheels are firmly coupled to each other by coupling means which are not shown. By slightly staggering rings 20 and 21 by an angle corresponding to the width of one tooth, or by means of a similar measure, the magnetic flux via the pole shoes and via the air gaps between the pole shoe ends and the teeth and via the signal generator rings will change its direction during the rotary motion in a manner corresponding to that described above with reference to FIG. 1. This staggering of the signal generator rings 20, 21, or rather of the two spur gears, is represented in FIG. 3. In the illustrated position the main magnetic flux passes via the pole shoe end confronting a tooth 40, via the coil core 41, via the second pole shoe, and via tooth 42 of the second toothed wheel, which tooth 42 is opposite the end piece of the second pole shoe.

Figure 4:
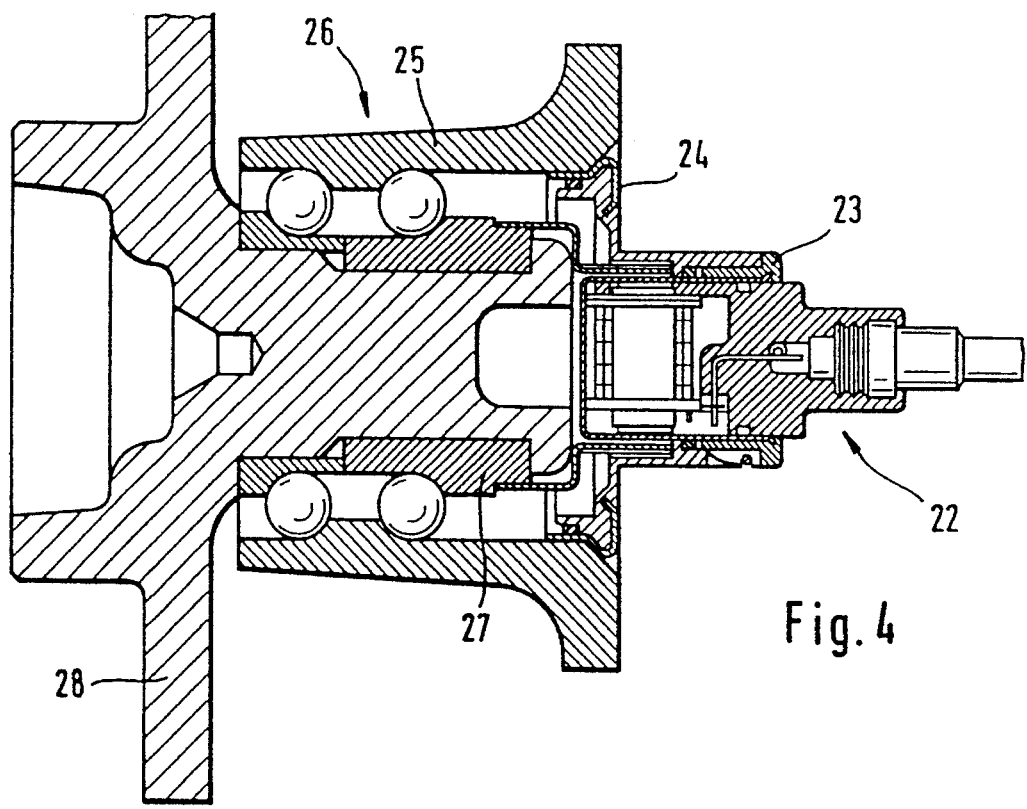
FIG. 4 is an axial section showing the present invention applied as a plug-in wheel bearing sensor.
Figure 5:
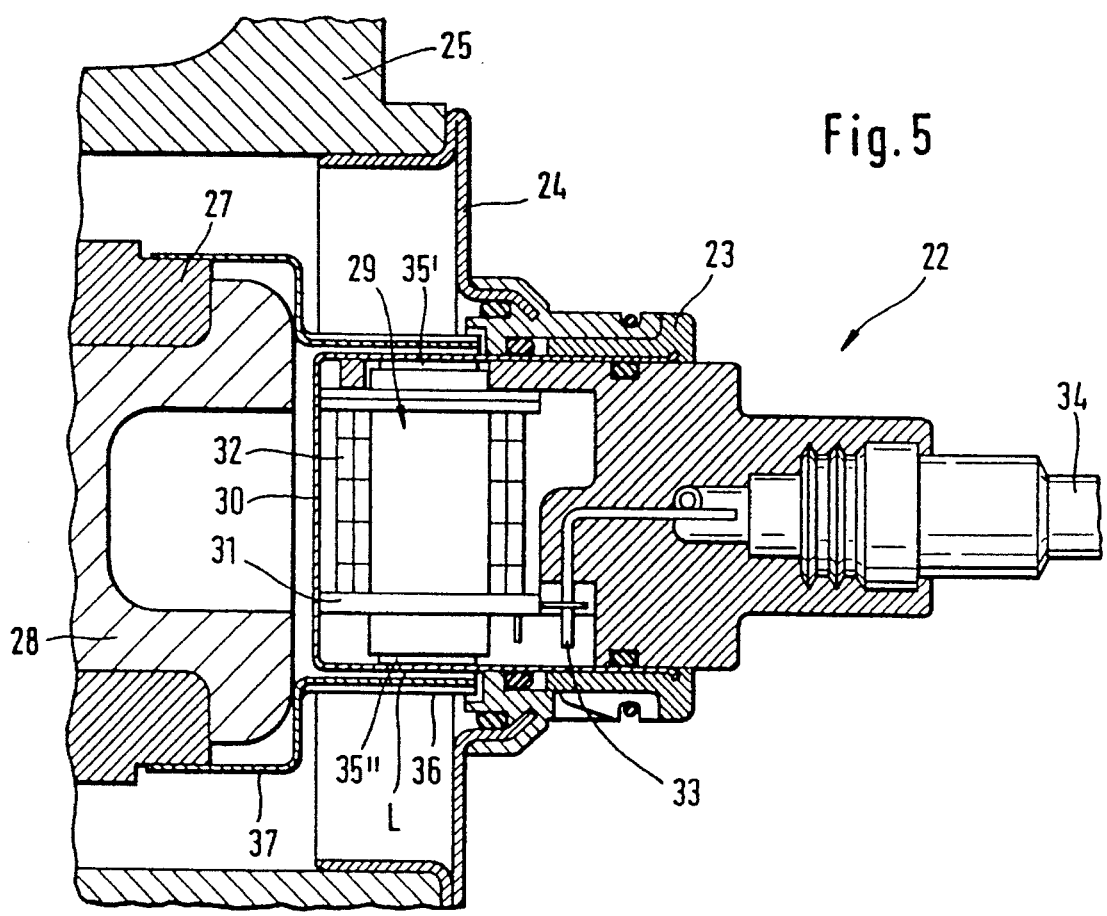
FIG. 5 is an enlarged view of a portion of FIG. 4.

FIGS. 4 and 5 show a particularly expedient embodiment and arrangement of the present invention as a measuring device used in a wheel bearing. In this case, the measuring device is designed in the form of a plug-in transducer or sensor 22. The sensor 22 is seated in a sensor housing 23 connected with, or rather fastened to, the stationary outer ring 25 of a wheel bearing by means of a flange, retaining ring 24 or the like. An inner ring 27 of the wheel bearing 26 supporting a wheel shaft 28 undergoes the rotary motion that is to be measured.

FIG. 5 shows an enlarged representation of the embodiment of FIG. 4 and thus permits further details to be recognized. In FIGS. 4 and 5, like reference numerals are used for like parts, any deviations that are of no importance to the present invention being neglected.

As electrically essential components, the plug-in sensor 22 shown in FIG. 5 (and FIG. 4) contains a double-sided measuring coil 29 which, in terms of its design and operation, corresponds to the measuring coil 3 described with reference to FIG. 1. The coil 29 is arranged in a cylindrical, or cup-shaped, housing 30 so that the coil axis is aligned perpendicularly to the axis of the housing 30 and, hence, also perpendicularly to the axis of the rotating wheel. Essential components of the coil again are a winding 32 carried by a coil form 31, a permanent magnet core and pole shoes. In FIG. 5, only the ends 35', 35" of a pole shoe are discernible as they extend beyond the coil as far as the wall of the cylindrical housing 30. The connections of the winding 32 lead outwards via electrical conductors 33 indicated inside the sensor 22 and via a connecting cable 34.

The signal generator ring of the embodiment of the present invention shown in FIG. 5 is designed in the form of a hollow-cylindrical section 36 of a sleeve 37 fastened to the inner ring 27 of the bearing. Inside, the hollow-cylindrical section 36 is provided with teeth in the same way as the signal generator ring shown in FIG. 1; of course, it is also possible to select any one of the other signal generator embodiments described above.

The hollow-cylindrical section 36 of the signal generator ring 36/37 is supported relative to the sensor 22 or on the cylindrical or cup-shaped housing 30 of the sensor 22, so that unhindered rotary motion is possible around the common axis relative to the stationary sensor 22. As a small air gap L, as constant as possible, is to be maintained between the ends 35', 35" of the pole shoes and the teeth or segments of the signal generator (the mutual arrangement of the pole shoes 5, 6 and the teeth 10, 11 having been explained in connection with FIG. 1), a sliding or rotating support member between the cylindrical section 36 and the housing 30 of the sensor 22 can be used. A sliding or rotating support member in the form of, for example, a sliding layer would be sufficient in many applications.

In the exemplary embodiment of FIGS. 4 and 5, the present invention results in a particularly simple and low-cost device which can be mounted with little expenditure and effort.

A further important advantage of the embodiment depicted in FIGS. 4 and 5 lies in the small space requirements of the measuring device. The housing 23 into which the sensor 22 is plugged may, for instance, be designed as a component of the grease cap of a wheel bearing.

Figure 6:
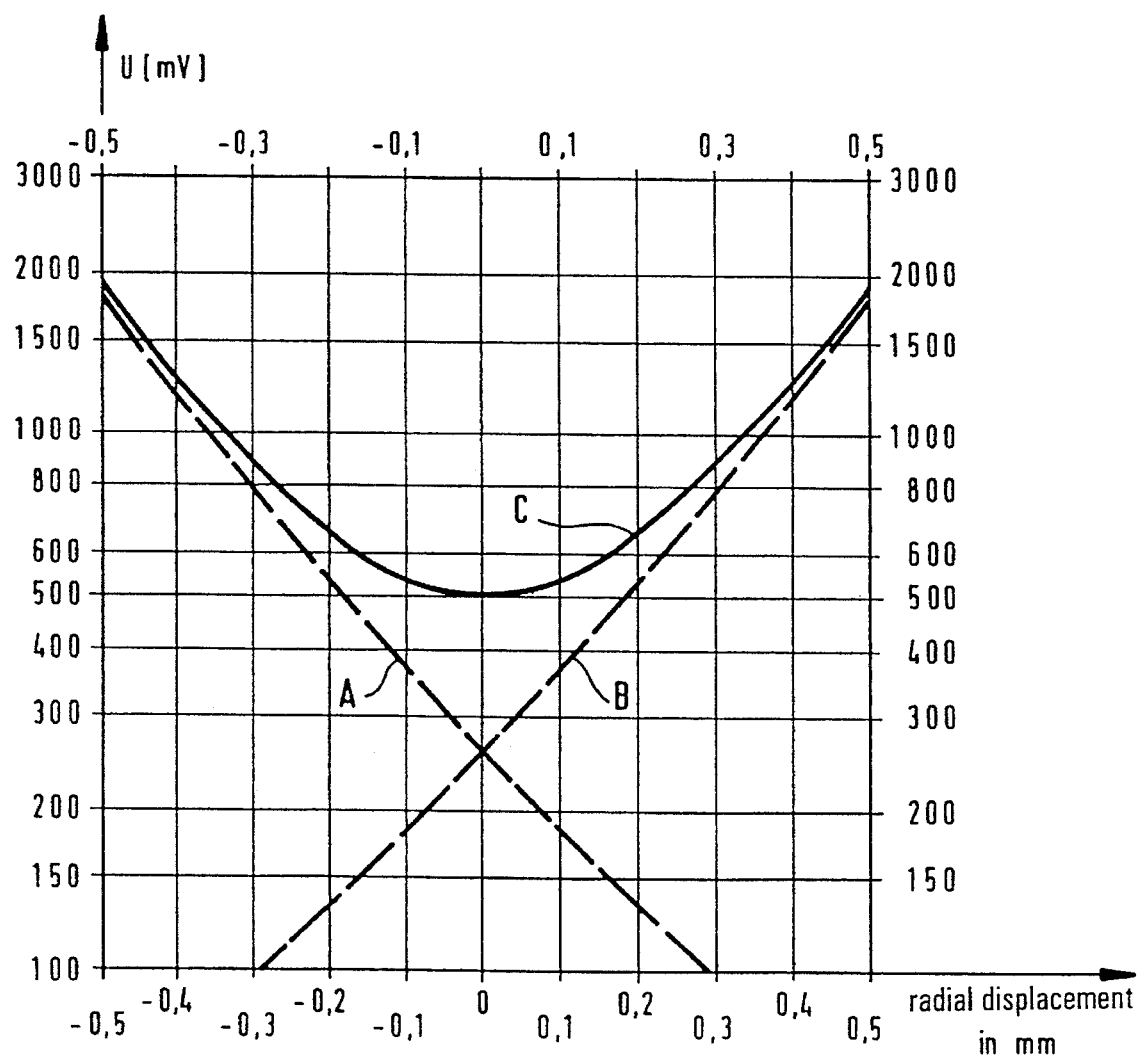
FIG. 6 is a diagram plotting transducer output voltage against air gap distance for a device constructed in accordance with the present invention.

The diagram of FIG. 6 refers to the fundamental design of a measuring device of the present invention as described with reference to FIGS. 1, 4 and 5. FIG. 6 represents the signal voltage, or rather signal voltage amplitude U, measured by the measuring coil 3, 29, in relation to the radial displacement of the measuring coil relative to the axis of rotation of the signal generator ring 1, 36.

Each broken line A, B refers to a one-sided measuring coil, the fully traced characteristic line C referring to the double-sided measuring system provided by the present invention. From this representation, it is discernible that the dependence of the output voltage on the radial displacement and, hence, on air gap changes is relatively small with the present invention. In the range under consideration, the useful signal shown by curve C of FIG. 6 in all cases lies above the relatively high minimum value of 500 mV (with 50 cycles, a tooth module of approximately 0.6 mm and an air gap of approximately 0.5 mm). The same measurement results are to be expected for the embodiments of the present invention shown in FIGS. 2 and 3.

I claim:

1. A device for measuring rotary motions and for generating an electric alternating signal representative of the rotary motion, with a signal generator ring which has a center and is provided in the shape of a toothed wheel with teeth directed inwardly toward said center and which rotates with the part performing the rotary motion, and with a stationary inductive transducer which is arranged at least partly in an area defined by the signal generator ring and which has a measuring system with a measuring coil, a coil core and pole shoes, and wherein a magnetic flux travels through the measuring coil and is influenced by the signal generator at both axial ends of the coil, characterized in that the coil core has a permanent magnet, which has pole surfaces and is magnetized perpendicularly to the coil axis, and elongated pole shoes which are provided on the pole surfaces and arranged parallel to the coil axis, said elongated pole shoes having end pieces that protrude from both axial ends of the coil and reach as far as the signal generator ring, and in that the teeth of the signal generator ring and the pole shoes are designed, arranged and attuned in respect of one another such that any time the end piece of a pole shoe is opposite to a tooth the diametrically opposite end piece of the second pole shoe is likewise opposite to a tooth, and the other two end pieces of the pole shoes are opposite to tooth gaps, so that during the rotary motion the magnetic flux alternately passes in one direction via the end piece of one pole shoe to the diametrical end piece of the pole shoe arranged on the second pole surface, thereupon passing in another direction via the other two end pieces of the pole shoes etc.

2. A device for measuring rotary motions and for generating an electric alternating signal representative of the rotary motion, with a signal generator which rotates with the part performing the rotary motion, with a stationary inductive transducer furnished with a measuring coil with a coil core and pole shoes, and wherein a magnetic flux travels through the measuring coil and is influenced by the signal generator at both axial ends of the coil, characterized in that the signal generator is provided with two toothed wheels coupled to each other at least one of coaxially and in parallel, between which the transducer is interposed, in that the coil core consists of a permanent magnet magnetized perpendicularly to the coil axis and of two elongated pole shoes which are provided on the pole surfaces of the magnet and arranged parallel to the coil axis and whose end pieces protrude from both axial ends of the coil and reach as far as the toothings, as well as in that the toothed wheels and the pole shoes are designed and arranged such that, any time the end piece of one pole shoe is opposite to a tooth, the end piece of the second pole shoe protruding from the second coil side is likewise opposite to a tooth, the other two end pieces of the pole shoes being opposite to tooth gaps so that during the rotary motion the magnetic flux alternately passes via the end piece of one pole shoe in one direction to the diametrical end piece of the pole shoe arranged on the second pole surface, thereupon passing in another direction via the other two end pieces of the pole shoes, etc.

3. A device as claimed in claim 2, characterized in that the two toothed wheels of the signal generator are arranged coaxially, with one of said two toothed wheels being an outside toothed wheel and the other said two toothed wheels being an inside toothed wheel, said outside toothed wheel being provided with teeth directed inwardly toward said inside toothed wheel, and said inside toothed wheel being provided with teeth directed outwardly toward said outside toothed wheel.

4. A device as claimed in claim 2, characterized in that the two toothed wheels are arranged parallel to each other and are toothed on the front faces facing one another.

5. A device as claimed in claim 2, characterized in that, instead of the toothed wheels, there are provided rings comprising magnetic and non-magnetic segments, wherein the non-magnetic segments correspond to the tooth gaps.

6. A device for measuring rotary motions of a rotating part and for generating electric alternating signals representative of said rotary motions, said device comprising:

a signal generator ring having a perimeter and a center:
(a) comprising a toothed wheel having teeth directed inwardly toward said center and having tooth gaps,
(b) adapted for connection to and rotation with a rotating part, and
(c) defining an area within said perimeter; and a stationary inductive transducer disposed at least partly in the area defined by said signal generator ring and having a double-sided measuring system including:

(a) a measuring coil having an axis disposed along a diameter of said signal generator ring,
(b) a coil core having a permanent magnet with pole surfaces magnetized perpendicularly to said coil axis, and
(c) elongated pole shoes which are disposed on said pole surfaces of said permanent magnet parallel to said coil axis, and which have end pieces adapted to protrude from both axial ends of said measuring coil and to extend toward said signal generator ring;

said stationary inductive transducer developing a magnetic flux through said measuring coil which is influenced by said signal generator ring at both axial ends of said measuring coil, and said inwardly directed teeth and tooth gaps of said signal generator ring and said pole shoes disposed such that any time the end piece of one of said pole shoes is opposite a tooth, the end piece of another of said pole shoes protruding from the opposite coil end is also opposite a tooth and the other end pieces of said pole shoes are opposite tooth gaps, so that, during rotary motion, said magnetic flux alternately passes from the end piece of one of said pole shoes to the opposite end piece of another of said pole shoes in one direction, and between the other end pieces of said pole shoes in another direction.

7. A device for measuring rotary motion of a rotating part and for generating an electric alternating signal representative of the rotary motion, said device comprising:

signal generator rings:
(a) comprising toothed wheels coupled with each other at least one of coaxially and in parallel,
(b) adapted for connection to and rotation with said rotating part, and
(c) having teeth and tooth gaps; and a stationary inductive transducer disposed between said toothed wheels and having:
(a) a measuring coil having an axis,
(b) a coil core having a permanent magnet with pole surfaces and magnetized perpendicularly to said coil axis, and
(c) elongated pole shoes which are disposed on said pole surfaces of said magnet parallel to said coil axis, and which have end pieces adapted to protrude from both axial ends of the coil and to extend toward said inwardly directed teeth;

said stationary inductive transducer developing a magnetic flux through the measuring coil which is influenced by said signal generator rings on both axial ends of said double-sided measuring coil, and said toothed wheels and said pole shoes disposed so that, any time the end piece of one of said pole shoes is opposite a tooth, the end piece of another of said pole shoes protruding from the opposite coil end is also opposite a tooth and the other end pieces of said pole shoes are opposite tooth gaps so that, during rotary motion, said magnetic flux alternately passes from the end piece of one of said pole shoes to the opposite end piece of another of said pole shoes in one direction, and between the other end pieces of said pole shoes in another direction.

8. A device as claimed in claim 7 wherein said toothed wheels are disposed coaxially, with an outside toothed wheel and an inside toothed wheel, said outside toothed wheel having teeth directed inwardly toward said inside toothed wheel and said inside toothed wheel having teeth directed outwardly toward said outside toothed wheel.

9. A device as claimed in claim 7 wherein said toothed wheels are disposed parallel to each other with confronting faces having teeth.

10. A device as claimed in claim 7 wherein said signal generator ring comprises:

(a) magnetic segments, and (b) non-magnetic segments corresponding to said tooth gaps.

11. A device as claimed in claim 7 wherein said signal generator ring comprises non-magnetic segments corresponding to said tooth gaps.

12. A method of measuring rotary motion of a rotating part and of generating electric alternating signals representative of the rotary motion using a stationary inductive transducer having a permanent magnet core and pole shoes attached to said core with end portions of the pole shoes extending beyond axial ends of the stationary inductive transducer, and using a signal generator ring having a perimeter with spaced portions thereon that are adapted to create a magnetic flux through said stationary inductive transducer when the portions are adjacent the end portions of the pole shoes, said method comprising the steps of:

connecting said signal generator ring to said rotating part;

creating a reversible magnetic flux through said stationary inductive transducer by having said spaced portions on said signal generator ring alternately rotate from a first position wherein an end portion of one of said pole shoes extending from one axial end of said stationary inductive transducer and an end portion of another of said pole shoes extending from the opposite axial end of said stationary inductive transducer, are adjacent said portions of said signal generator ring, while the remaining end portions of said pole shoes are adjacent spaces between said portions, to a second position wherein the end portions that were adjacent said portions of said signal generator ring are adjacent spaces, and the end portions that were adjacent spaces are adjacent said portions of said signal generator ring, said magnetic flux travelling through said stationary inductive transducer alternately in two opposite directions and being influenced by said signal generator ring at both axial ends of said stationary inductive transducer as a result of said portions of said signal generator ring rotating past said end portions of said pole shoes; and measuring the frequency of changes in the value of said magnetic flux resulting from reversal of the magnetic flux and using said changes to determine the speed of rotation of said rotating part.

13. A device for measuring rotary motions of a rotating part and for generating electric alternating signals representative of said rotary motions, said device comprising:

a signal generator ring having a center comprising a toothed wheel having teeth directed inwardly toward said center and tooth gaps and adapted for connection to and rotation with a rotating part; and a stationary inductive transducer disposed at least partly within said signal generator ring and having a double-sided measuring system including:

(a) a measuring coil having an axis disposed along a diameter of said signal generator ring, (b) a permanent magnet coil core magnetized perpendicularly to said coil axis, and (c) first and second pole shoes:

(1) on surfaces of said coil core, (2) arranged parallel to said coil axis, (3) each having ends which protrude from both axial ends of said coil and extend toward said signal generator ring, and (4) disposed relative to said signal generator ring such that any time the end piece of one of said pole shoes is opposite a tooth, the end piece of another of said pole shoes protruding from the opposite coil end is also opposite a tooth and the other end pieces of said pole shoes are opposite tooth gaps, so that, during rotary motion, a magnetic flux is developed through said measuring coil, said magnetic flux (i) being influenced by said signal generator ring at both axial ends of said measuring coil, and (ii) alternately passing between said pole shoes through said coil core in a first direction and between said pole shoes through said coil core in a second direction opposite to said first direction.

14. A device as claimed in claim 13 wherein said first and second pole shoes:

(a) each have first and second ends which protrude from both axial ends of said coil and extend toward said signal generator ring, and (b) are disposed relative to said signal generator ring so that, during rotary motion, magnetic flux alternately passes from said first end of said first pole shoe through said coil core to said second end of said second pole shoe in a first direction and from said second end of said first pole shoe through said coil core to said first end of said second pole shoe in a second direction opposite to said first direction.

\* \* \* \* \*